United States Patent

[11] 3,622,806

[72] Inventor Richard J. Williams
Carson, Calif.

[21] Appl. No. 876,478
[22] Filed Nov. 13, 1969
[45] Patented Nov. 23, 1971
[73] Assignee International Rectifier Corporation
Los Angeles, Calif.

[54] DYNAMIC GATE BIAS FOR CONTROLLED RECTIFIERS
6 Claims, 2 Drawing Figs.

[52] U.S. Cl. .......... 307/252 N, 307/202, 307/217, 307/252 C, 307/296, 307/305
[51] Int. Cl. .......... H03k 17/00
[50] Field of Search .......... 307/252.22, 252.51, 296, 217, 202, 252.70, 305

[56] References Cited

UNITED STATES PATENTS 3,350,607 10/1967 Jones .......... 307/252

*Primary Examiner*—Donald D. Forrer
*Assistant Examiner*—David M. Carter
*Attorney*—Ostrolenk, Faber, Gerb & Soffen

ABSTRACT: A pickup circuit connected to the main power circuit of a controlled rectifier generates an output signal responsive to the forward rate-of-change-of-voltage across the main terminals of the controlled rectifier. This output signal is then connected to the gate of the controlled rectifier as a negative gate bias, the magnitude of which is related to the rate-of-change-of-forward-voltage across the controlled rectifier device.

PATENTED NOV 23 1971 3,622,806

INVENTOR.
RICHARD J. WILLIAMS

BY
Ostrolenk, Faber, Gerb & Soffen

ATTORNEYS

DYNAMIC GATE BIAS FOR CONTROLLED RECTIFIERS

FIELD OF INVENTION

This invention relates to biasing circuits for controlled rectifiers, and more particularly relates to a biasing circuit for a controlled rectifier, the energy of which is derived directly from the main power circuit, wherein a negative bias is provided under conditions, which may be random, and which call for a negative gate bias for improved performance of the device.

THE PRIOR ART

It is old and well known to provide a negative gate bias for a controlled rectifier, commonly called a thyristor. Such a negative gate bias, which may be from −1 to −5 volts, improves the ability of the controlled rectifier to withstand a rapid rate-of-change-of-forward-voltage without unintentionally firing. The negative gate bias further operates to decrease turnoff time and makes the gate less sensitive to firing responsive to noise in the firing circuit.

A negative gate bias is commonly provided by a separate negative power supply for each gate of a system using controlled rectifiers or from a single power supply, with isolation transformers provided between the controlled rectifier gates. Whichever structure is used, they are both costly and bulky and in each case high-frequency noise suppression becomes difficult.

The presence of the constant negative gate bias also causes relatively high power dissipation in the gate-cathode junction.

Moreover, if the source supplying the negative gate bias has approximately the same voltage as the source of positive gate drive (required to trigger the device into conduction when desired), the impedance of the negative gate circuit can be only slightly larger than the positive gate impedance. Therefore, the positive gate signal will be considerably reduced by the shunt effect of the negative gate impedance. This problem is, in fact, accentuated under usual conditions since the negative gate voltage is normally much lower than the firing pulse voltage.

To overcome some of the above problems, circuits have been constructed in which the negative gate bias is pulsed so that it is present during times when it is known to be necessary, as during known turnoff intervals, or during an anticipated switching *dv/dt*. This technique still requires the separate power supply which is further complicated by the circuitry requiring switching during such known intervals. Clearly, however, this type structure cannot provide the negative gate bias during a random event which would necessitate a negative gate bias and which occurs outside of the normal time sequence of the pulsing circuit.

SUMMARY OF INVENTION

In accordance with the present invention, negative bias is applied to the gate of a controlled rectifier responsive to a condition requiring such a negative bias, using energy derived from the main circuit. Thus, a separate power supply is not required by the present invention and the negative gate bias is applied to the gate only during those random conditions necessitating such negative bias. Moreover, the positive firing circuit can now be shunted by a relatively high impedance to improve the efficiency of such positive firing circuits.

In accordance with the invention, a circuit is connected across the controlled rectifier main terminals and differentiates the voltage across the main terminals of the controlled rectifier. The differentiated voltage is then used as an output signal which is applied into the gate circuit of the controlled rectifier as a negative bias. Thus, under high rate-of-change-of-forward-voltage, which might fire the controlled rectifier in the absence of a negative biasing gate signal, a negative bias is immediately developed at the gate to suppress such inadvertent firing. Since the negative gate bias is present only during those conditions requiring negative gate bias, there will be minimum gate power dissipation; the negative source impedance can be made high relative to the impedance of the gate firing circuit; and good high-frequency noise suppression can be obtained during the positive *dv/dt* period. Another important advantage of the invention is that it permits high rates of reapplication of forward voltage following turnoff. Thus, after conduction is ended, and forward voltage is reapplied, a negative gate bias is generated, allowing the device to block in the forward direction even though the forward junction is only partly recovered. Moreover, the invention permits the use of very high reapplication rates without a significant increase in turnoff time.

DETAILED DESCRIPTION OF PREFERRED EMBODIMENT

Figure 1:
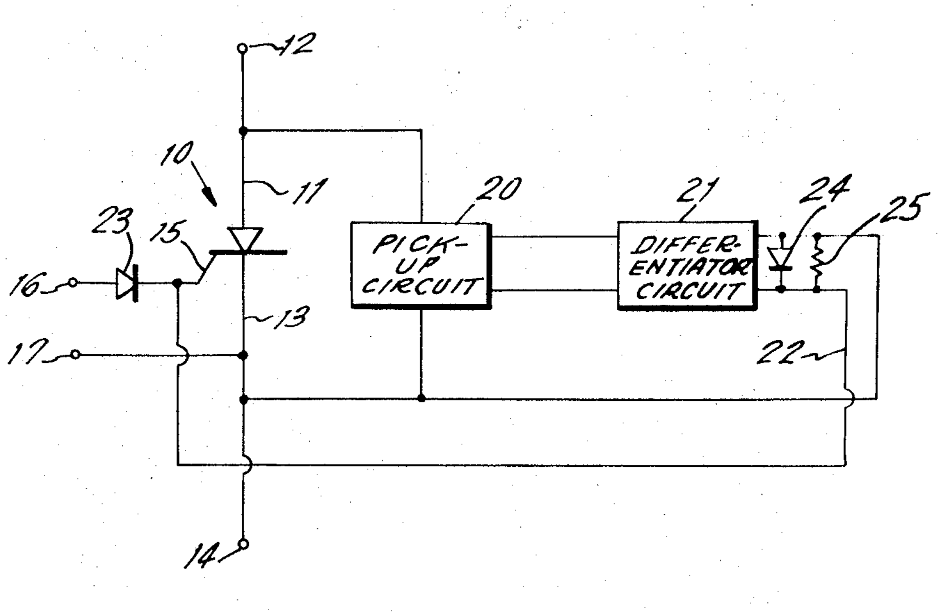
FIG. 1 shows the present invention in a block diagram fashion.

Referring first to FIG. 1, there is illustrated a controlled rectifier 10 having a main anode lead 11 connected to terminal 12 and a main cathode lead 13 connected to a terminal 14. A gate lead 15 is connected to gate terminal 16 and a second gate terminal 17 is connected to cathode lead 13.

In accordance with the present invention, a suitable pickup circuit 20 is connected to the power circuit of controlled rectifier 10 as by the connection to leads 11 and 13. The output voltage of pickup circuit 20, which is the voltage across the controlled rectifier 10, is then applied to a suitable differentiator circuit 21. The output of the differentiator circuit 21 is then connected across the gate lead 15 and cathode lead 13, with a polarity such that lead 22 is negative responsive to rising voltages in a forward direction across the controlled rectifier 10. Thus, responsive to such rising forward voltages, the differentiator circuit 21 generates a negative bias for gate 15, which will suppress unintentional firing of the gate.

A suitable positive pulse circuit for firing the controlled rectifier 10 may be connected to terminals 16 and 17 and through the diode 23, where diode 23 prevents the output of differentiator circuit 21 from being injected into the positive gate circuit. It will be noted that the magnitude of the potential negative bias current on lead 15 will depend upon the magnitude of the rate-of-change-of-forward-voltage measured across the controlled rectifier 10. Diode 24 is connected across the output of differentiator circuit 21 to prevent the application of positive pulses to gate lead 15 responsive to rates-of-change-of-voltage in the reverse direction across controlled rectifier 10. Resistor 25 may be a clamping diode or any suitable impedance and clamps the negative biasing voltage output of differentiator 21.

Figure 2:
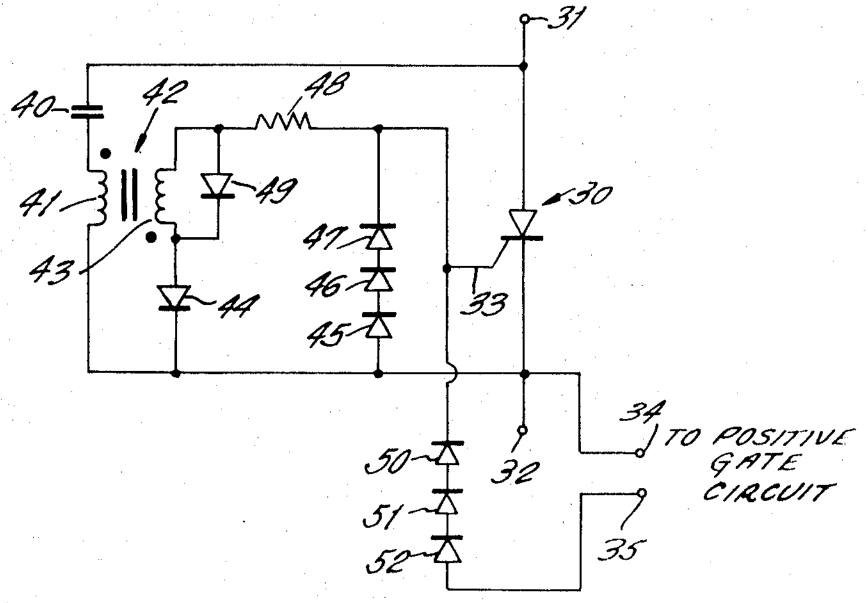
FIG. 2 shows a detailed circuit diagram showing a controlled rectifier incorporating the present invention.

FIG. 2 illustrates a detailed circuit diagram of one circuit incorporating the present invention. Referring to FIG. 2, there is illustrated a controlled rectifier 30 having an anode terminal 31 and cathode terminal 32. The gate lead 33 of controlled rectifier 30 is connected to a positive gate firing circuit which is connected to terminals 34 and 35, as illustrated.

In accordance with the invention, a capacitor 40, connected in series with the primary winding 41 of transformer 42, is connected directly across terminals 31 and 32 of controlled rectifier 30. The secondary winding 43 of transformer 42 is wound such that the conventional black dots on windings 41 and 43 will have the same polarity. Winding 43 is connected in closed series relation with diode 44, diodes 45, 46 and 47, and resistor 48. Diode 49 is connected in parallel with winding 43. Terminal 35 of the positive gate circuit is connected to gate 33 through diodes 50, 51 and 52, as shown. The positive gate circuit causes firing of the controlled rectifier 30 under normal conditions by applying a positive-going pulse to terminal 35 which is then applied through diodes 50, 51 and 52 to the gate terminal 33, thereby to fire the controlled rectifier 30. Diodes 50, 51 and 52 serve the purpose of diode 23 of FIG. 1 and prevent negative-going pulses from the negative gate bias circuit from entering the positive-gate bias circuit.

When there is a forward-rising voltage across the controlled rectifier 30, this voltage is differentiated by capacitor 40, the current flow into capacitor 40 being in series with winding 41. Accordingly, a voltage is induced in winding 43 which is proportional to the rate-of-rise-of-voltage across controlled rectifier 30. This voltage is then applied through diode 44, across diodes 45 to 47, which are in parallel with the gate circuit including terminals 32 and 33. Note that diodes 45 to 47 are equivalent to impedance 25 of FIG. 1, while diode 44 is equivalent to diode 24 of FIG. 4. Preferably, diode 44 is a fast-recovery diode to prevent reverse recovery current from triggering controlled rectifier 30. Resistor 48 serves as a current-limiting resistor in the closed circuit including transformer winding 43 and diodes 44 to 47. The forward-voltage drop across diodes 45, 46 and 47 is then applied to gate 33 as a negative bias, the source impedance of which is related to the magnitude of the rate-of-change-of-forward-voltage across terminals 31 and 32. It will be noted that diodes 45, 46 and 47 are used to clamp this negative voltage to a safe and desirable level where this can be adjusted by the addition or subtraction of diodes from the series chain. In the general case, any suitable impedance could be used for this purpose.

The diode 49 is connected across transformer winding 43 to further prevent triggering or firing of the controlled rectifier 30 responsive to a rate-of-change-of-voltage in a reverse direction across controlled rectifier 30 which could apply a positive signal to gate lead 33 to fire the controlled rectifier. Such positive signals are short-circuited by the diode 49. Note that as the positive *dv/dt* increases and the demand for the gate 33 for more negative current increases, that the current applied by the circuit increases proportionately. When the resistance of resistor 48 is small compared to the impedance of capacitor 40, the maximum available negative current is given by $I_{MAX}=C\,dv/dt$.

It can also be shown that the design of transformer 42 is not critical. Thus, the volt-seconds applied to the transformer will be constant as the voltage increases at any particular rate to a specified voltage. In particular, it can be shown that the number of volt-seconds for transformer 42 is proportional to the product of the capacitance of capacitor 40, the resistance of resistor 48, and the change in voltage. It is to be noted that, after turnoff of the controlled rectifier 30, that the reinstitution of forward blocking voltage will generate a negative gate bias, thereby permitting the use of high reapplication rates of forward voltage.

The circuit of FIG. 2 has numerous advantages over the prior art, including simplicity and low cost as compared to fixed DC bias sources. Moreover, there is a minimum gate power dissipation and, of course, no external power supply is needed. In the circuit of FIG. 2, it will be seen that the size of the negative source impedance is basically limited by the transformer volt-second capability rather than the voltage of the negative source. Therefore, the circuit can be designed to prevent minimal shunting of positive gate current. A further advantage of the present invention is that the negative gate current increases linearly with forward *dv/dt*. The use of clamping diodes allows the gate to draw only the current necessary to prevent false triggering, further limiting rate power dissipation. The low impedance of the diode train 45, 46 and 47 to high frequency will also provide good noise suppression during the positive *dv/dt* period which has been a problem with conventional negative bias sources in the past. It is also clear that the novel circuit of FIGS. 1 and 2 will protect against adverse *dv/dt* conditions whether random or periodic. Moreover, the circuit shortens the turnoff time of the controlled rectifier device when recovering by generating a negative gate bias when blocking is demanded. Therefore, high reapplication rates of forward voltage can be used.

The particular location of capacitor 40 should be noted as between the winding 41 and anode terminal 31. This arrangement allows a minimized voltage rating for transformer 42, as compared to the connection of capacitor 40 between winding 41 and the cathode terminal 32.

A circuit which obtains the above advantages could operate as described, may use the following components:

| | |
|---|---|
| Capacitor 40 | 470 pf. at 1 KV |
| Resistor 48 | 100 Ohms at ½ Watt |
| Diode 44 | Type IN4154 (Hughes) |
| Diodes 45,46,47,49 50,51, 52 | International Rectifier Type 10D3 |

The controlled rectifier 30 may be of any type and similarly transformer 42 could be of any type. One suitable transformer is type number 4016, manufactured by Gudeman.

If desired, a resistor may be connected in series with capacitor 40 to eliminate the possible resonance of capacitor 40 with the external circuit.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

I claim:

1. A negative bias circuit for a controllably conductive semiconductor device; said controllably conductive semiconductor device comprising first and second main terminals and a gate terminal; said first and second main terminals connectable in a circuit imposing a variable voltage difference between said first and second main terminals; said negative bias circuit comprising; pickup circuit means coupled to said first and second main terminals and having an output voltage related to the voltage across said first and second main terminals, differentiation circuit means connected to said pickup circuit means for differentiating said output voltage of said pickup circuit means and having and output voltage related to the derivative of said voltage across said first and second main terminals, and circuit means for normally connecting said output voltage of said differentiation circuit means across said gate terminal and one of said main terminals; the polarity of said output voltage being such that said gate terminal is negative with respect to said one of said main terminals when the potential at the other of said main terminals is rising with respect to the potential of said one main terminal.

2. The negative bias circuit of claim 1 which includes voltage clamping means connected across said output voltage of said differentiation circuit means.

3. The negative bias circuit of claim 1 which includes diode means connected across said output voltage of said circuit means to short circuit the output of said circuit means when the potential at the other of said main terminals is decreasing with respect to the potential of said one main terminal.

4. The negative bias circuit of claim 1 wherein said differentiation circuit means includes a capacitor; and wherein said circuit means includes a transformer winding having first and second winding portions; at least said first winding portion connected in series with said capacitor; at least said second winding portion connected across said gate terminal and said one of said main terminals.

5. The negative bias circuit of claim 4 which includes a suppression diode means connected across said second winding portion, and a clamping diode means connected across said gate terminal and said one of said main terminals.

6. The negative bias circuit of claim 5 which further includes a series-connected diode and resistor connected in closed series circuit relation with said second winding portion and said clamping diode means.

* * * * *